(12) United States Patent
Mathena et al.

(10) Patent No.: US 7,764,619 B2
(45) Date of Patent: Jul. 27, 2010

(54) SIGNAL ROUTING ERROR REPORTING

(75) Inventors: Roy P. Mathena, Austin, TX (US); Robert W. Thurman, Austin, TX (US)

(73) Assignee: National Instruments Corporation, Austin, TX (US)

( * ) Notice: Subject to any disclaimer, the term of this patent is extended or adjusted under 35 U.S.C. 154(b) by 959 days.

(21) Appl. No.: 11/166,759

(22) Filed: Jun. 24, 2005

(65) Prior Publication Data

US 2006/0291399 A1 Dec. 28, 2006

(51) Int. Cl.
*G01R 31/08* (2006.01)
(52) U.S. Cl. .................................. 370/241; 709/238
(58) Field of Classification Search .............. 370/241; 709/240, 242
See application file for complete search history.

(56) References Cited

U.S. PATENT DOCUMENTS

| 5,912,633 | A  | * | 6/1999 | Allison et al. ......... 340/870.02 |
| 6,570,867 | B1 | * | 5/2003 | Robinson et al. ............ 370/351 |
| 6,728,779 | B1 | * | 4/2004 | Griffin et al. ............... 709/239 |
| 6,873,928 | B2 |   | 3/2005 | Thurman et al. |
| 2003/0005155 | A1 | * | 1/2003 | Carbonell et al. .......... 709/239 |
| 2003/0028852 | A1 |   | 2/2003 | Thurman et al. |
| 2003/0035416 | A1 |   | 2/2003 | Zirojevic et al. |
| 2003/0035417 | A1 |   | 2/2003 | Zirojevic et al. |
| 2003/0043757 | A1 |   | 3/2003 | White |
| 2003/0046004 | A1 |   | 3/2003 | White et al. |
| 2003/0046657 | A1 |   | 3/2003 | White |
| 2004/0015924 | A1 |   | 1/2004 | Shah et al. |

\* cited by examiner

*Primary Examiner*—Vivek Srivastava
*Assistant Examiner*—Ryan J Jakovac
(74) *Attorney, Agent, or Firm*—Meyertons Hood Kivlin Kowert & Goetzel, P.C.; Jeffrey C. Hood; Mark S. Williams

(57) ABSTRACT

System and method for analyzing routing in a system. Routing information for the system, received, e.g., from a user and/or tool, is analyzed, where the routing information specifies a plurality of routes in the system, and where each route comprises one or more routing resources in the system. A routing conflict between two routes of the plurality of routes is determined based on the analyzing, where the routing conflict is with respect to a routing resource comprised in each of the two routes, e.g., incompatible reservations and/or incompatible specified configuration of a routing resource included in each of the two routes. An error message useable in debugging routing for the system is output indicating the routing conflict, where the error message includes identification of the two routes, e.g., respective names, sources and destinations, and/or routing resource sequences, of the two routes, and may optionally include identification of the routing resource.

24 Claims, 16 Drawing Sheets

Terminals t0-t3 can each be routed to terminals t4-t7 by configuring some combinations of muxes m0-m3.

The user has reserved a route (thick dark line) from terminal t2 to terminal t6, in task "myTask". Multiplexers m1 and m2 are reserved, each with a specific configuration.

SIGNAL ROUTING ERROR REPORTING

FIELD OF THE INVENTION

The present invention relates to the field of signal routing, and more particularly to a system and method for improved signal routing error reporting.

DESCRIPTION OF THE RELATED ART

Many systems, such as measurement, control, automation, design, and testing systems, among others, involve signal routing to implement and perform their functions. For example, in the design or configuration of circuit boards, e.g., for data acquisition (DAQ) systems, signal routes must be specified and verified for the various functionalities of the board. The various signal routes generally must be debugged, e.g., conflicts between routes, e.g., regarding routing resources such as multiplexers, I/O terminals, etc., must be detected and resolved. As another example, complex systems involving numerous interacting components or devices must often be assembled and configured for a particular application. Signal routes for the system must generally be specified and tested, and any routing conflicts similarly detected and resolved.

FIGS. 1A and 1B illustrate exemplary systems for which signal routes may be determined and implemented. FIG. 1A illustrates the topography of a PXI-4070 card from National Instruments Corporation, according to the prior art. As FIG. 1A shows, the card includes a plurality of MUXes 02-20, and a DMM Timing Engine 30. As FIG. 1A also shows, each MUX may receive input from a variety of sources. For example, the AuxTrig0 MUX 02 may receive input from AuxSyncInverter 06 and VMC (or !VMC) from the DMM Timing Engine 30, or may be set to high-Z with the tristate terminal of the MUX, effectively removing the MUX from any routes. Each MUX may be configured to receive input from another component, thus, a variety of routes may be effected by configuration of the MUXs.

FIG. 1B illustrates one example of routing between multiple devices, specifically, two PCI devices over an RTSI cable, according to the prior art. As FIG. 1B shows, a first PCI device 40 is coupled to a second PCI device 50 over RTSI cable 60. A terminal on each device (terminal A 42, terminal B 52) provides a connection to each device's RTSI connector (62A, 62B). Routing for this system may utilize various reservable resources of the system, e.g., RTSI lines and PFI lines.

Although routing for many systems is implemented and tested manually, increasingly, route determination, configuration, and testing and debugging, is performed programmatically, i.e., by routing systems that operate to analyze a system and determine (and possibly implement) signal routes for the desired functionality of the system. Such automatically determined routes must still be tested and debugged in the context of the system. As used herein, the term "routing system" is meant to denote any program or set of programs and/or hardware which operates to analyze routes of a system and detect routing conflicts. As noted above, some routing systems may also be operable to determine and/or implement signal routing, as well. For further information regarding such routing systems, please see co-pending U.S. patent application Ser. No. 10/174,157, titled "Dynamic Routing for a Measurement System", filed Aug. 30, 2002, U.S. patent application Ser. No. 10/231,543, titled "Routing with Signal Modifiers in a Measurement System", filed Aug. 30, 2002, U.S. patent application Ser. No. 10/174,445, titled "Shared Routing in a Measurement System", filed Aug. 30, 2002, and U.S. patent application Ser. No. 10/232,151, titled "Meta-Routing Tool for A Measurement System", filed Aug. 30, 2002, each of which is hereby incorporated by reference.

Routing systems typically report routing conflicts as an error. However, prior art approaches to error reporting in routing systems are generally limited to simply reporting that a route has failed, possibly naming the source and destination of the route which failed, and perhaps the conflicted resource.

For example, consider a routing system that calculates a route in a system. The routing system locates or determines routing resources (e.g., MUXes, I/O terminals, etc.) in the system to make the route. Note that the system may not use a particular resource in more than one configuration simultaneously. The system tracks or reserves the desired configuration for each resource. Future routes can reuse those resources. If a route fails because a previous route is using or reserving an incompatible arrangement, e.g., configuration, an error may be reported. An exemplary prior art routing error message may look something like this:

Error −89137 occurred at DAQmx Start Task.vi
Possible reason(s):
Specified route cannot be satisfied, because it requires resources that are currently in use by another route.
Property: SampClk.OutputTerm
Destination Device: dev1
Destination Terminal: PFI4
Task Name: aiTask As may be seen, only the failed route is indicated, and so the user must debug the routing problem with little information to help determine and correct the conflict.

FIGS. 2A-2C illustrate such a routing restriction in a simple system. As FIG. 2A shows, A, B, and C are terminals in a routing system. Resource X can connect A to C, or B to C, but cannot connect both A and B to C (at the same time). Thus, X is a single resource that has multiple possible uses. As shown in FIG. 2A, resource X is in an idle state, i.e., is not currently being used.

FIG. 2B illustrates the system of FIG. 2A, but where resource X is configured to route from A to C, as indicated by the bold arrows denoting the configured route. FIG. 2C illustrates an incorrect use of resource X, specifically, the simultaneous use of X in routes from A to C and from B to C, which, as shown, is prohibited. Such incorrect routing will typically result in an error condition. In other words, if X is configured to connect A to C, connecting B to C would violate the restriction described above, and so the system cannot connect B to C. The system may accordingly report an error. As noted above, prior art technology can only report that the route from B to C failed because some other route is using a resource required by the route (from B to C). For example, the user may be presented with an error with information like this before: "You tried to route B to C. This failed because another route has reserved a resource you need". Thus, the user has to debug the conflict with little information. With such a trivial system, this is not a problem. However, with more complex systems, this is a substantial problem. Thus, improved systems and methods for improved error reporting in routing systems are desired.

SUMMARY OF THE INVENTION

Embodiments of a system and method for analyzing routing in a system are presented. Routing information specifying a plurality of routes in a system may be analyzed. Each route preferably includes one or more routing resources, such as multiplexers (MUXes), I/O terminals, etc. Each route may have a source and a destination, and may provide a signal communication path from the source to the destination. The system may be comprised on a single device, or the system may include a plurality of interconnected devices, where each of at least a subset of the plurality of routes may extend over two or more of the plurality of interconnected devices. For example, in various embodiments, the system may include or be included in one or more of: an industrial automation system, a process control system, and a test and measurement system, although it should be noted that the techniques disclosed herein are broadly applicable to any application domain, e.g., to any system that utilizes signal routing.

In some embodiments, the routing information may originate from the user, from an auto-routing system, e.g., a routing tool or program, an external system, or any combinations thereof. For example, in one embodiment, an auto-routing tool may determine a plurality of routes in the system, e.g., based on analysis of routing requirements for the system, and may provide routing information specifying the routes to the present method, which may then analyze all of the routes. In another embodiment, a user may provide the information specifying the plurality of routes, e.g., based on routing requirements for the system.

In a preferred embodiment, the routing information may be provided incrementally. For example, in one embodiment, the routing information for the system may specify a proposed new route of the plurality of routes in the system, and one or more routes comprising a remainder of the plurality of routes in the system, where the one or more routes are known to be valid. In other words, one or more routes may have been previously specified, e.g., by a user or tool/program, (e.g., and possibly validated), and then a new route specified, e.g., also by a user or program, where the proposed new route is analyzed with respect to the one or more routes in the system.

A routing conflict between two or more of the routes may be determined based on the above analysis. In preferred embodiments, the routing conflict is with respect to a routing resource included in each of the two routes, e.g., specification of incompatible configurations and/or reservations of one or more routing resources comprised in the routes. For example, a MUX may be specified for simultaneous use by two routes, where each route requires the MUX to be configured in a mutually incompatible way, i.e., a single configuration of the MUX may not serve the needs of both routes.

An error message indicating the conflicting routes may be output, e.g., for display on a display device, logging to a file, etc. The error message preferably includes information identifying the two routes, and is useable in debugging routing for the system.

It should be noted that the techniques described herein may be repeated as needed or desired. For example, one or more additional routing conflicts between additional respective pairs of routes of the plurality of routes may be determined based on the analyzing, where each additional routing conflict may include respective specification of incompatible configurations of one or more routing resources comprised in each route of the pair of routes.

A more detailed embodiment of the method may proceed thusly: Information proposing a route may be received. For example, in one embodiment, information proposing a route AB from source A to destination B in a system may be received, where A and B represent any type of route source and destination, respectively. In one embodiment, the routing information for the system specifies a proposed new route of the plurality of routes in the system, and one or more routes comprising a remainder of the plurality of routes in the system, where the one or more routes are known to be valid.

In other words, as described above, in one embodiment, one or more routes may have been previously specified, e.g., by a user or tool/program, (e.g., and possibly validated), and then a new route specified, e.g., also by a user or program, where the proposed new route may be analyzed with respect to the one or more routes in the system, as described in detail below.

In one embodiment, the routing information specifying the proposed new route may be based on user input specifying a source and destination for the new route, e.g., source A and destination B. An attempt may be made to determine routing resources and respective configurations implementing the proposed route, e.g., route AB. In other words, the various routing resources, e.g., MUXes, I/O terminals, and so forth, of the system may be analyzed to try to determine a communication path from the route source A to the route destination B, where the path includes a sequence of routing resources. Said yet another way, an attempt may be made to find a successful implementation of route AB.

A determination may be made as to whether the route AB was found, i.e., whether the attempt to determine routing resources and respective configurations implementing the proposed route was successful. If the attempt was successful, the method may reserve the determined routing resource configurations, and associate each reservation with a route identifier for the proposed route, e.g., a route AB identifier, at which point the method may terminate.

If the attempt was unsuccessful, i.e., if a successful implementation of the proposed route was not found, then the system's routing resources may be analyzed regardless of current routing resource reservations to attempt to determine a hypothetical route, e.g., hypothetical route AB. Thus, in some embodiments, analyzing the proposed new route may include analyzing the routing resources and corresponding configurations of the system without regard to reservation status in order to try to determine a set of routing resources and configurations communicatively coupling the source of the proposed new route to the destination of the proposed new route.

If the hypothetical route AB was not found, i.e., if a successful implementation of the hypothetical route was not found, then the error is not a reservation error, and so an error may be output indicating that the system does not support a route from A to B, and the method may terminate, as indicated.

If the attempt was successful, i.e., if a successful implementation of the hypothetical route was found, then the error is a reservation error, and the method may analyze the routing resources of the hypothetical route, as described below. In other words, if the hypothetical route AB is valid, not taking into account the reservation status of the system's routing resources, then there is a reservation conflict between the proposed route and one or more of the previously specified (and reserved) routes, in which case the routing resources of the hypothetical route (e.g., hypothetical route AB) may be analyzed to determine the nature of the conflict, as described below.

A next routing resource in hypothetical route AB may be analyzed, and a determination made as to whether the routing resource reservation/configuration is valid. For example, the reservation status and configuration of the routing resource may be analyzed, e.g., with respect to the previously specified routes' reservation statuses and configurations, to determine if reserving and configuring the routing resource for inclusion in the hypothetical route AB would be in conflict (or not) with that resource's reservation status and configuration with respect to any other route that includes the resource.

If the routing resource reservation/configuration is found to be invalid, then associated route identifiers for the routing resource may be determined, if not already determined. In other words, any routes that already include the routing resource may be identified. In some embodiments, information regarding the routing resource itself may also be determined, e.g., identification information, e.g., an ID or description of the resource may be determined. In preferred embodiments, the associated route identifiers (and optionally the resource identification or description) may be stored for subsequent reference.

If the routing resource reservation/configuration is found to be valid, then if there are more routing resources in the hypothetical route AB to analyze, then the method may continue as described above, analyzing the next routing resource of hypothetical route AB.

If there are no further routing resources in the hypothetical route to analyze, an error message indicating the conflicting routes may be output, e.g., for display on a display device, logging to a file, etc., and the method terminated, as shown. The error message preferably includes information identifying the two routes, and is useable in debugging routing for the system.

Thus, summarizing the above, in some embodiments, determining a routing conflict between two routes of the plurality of routes may include: for each routing resource and corresponding configuration of the set of routing resources and configurations communicatively coupling the source of the proposed new route to the destination of the proposed new route, if the routing resource is configured in an incompatible manner with respect to the one or more routes comprising the remainder of the plurality of routes in the system, identifying the routing resource as a conflicted resource, and storing a route identifier of the routing resource, where the identification of the two routes included in the error message may be based on the stored route identifier(s) of the conflicted routing resource. In some embodiments, identification of the two routes may include one or more of: respective names of the two routes; respective sources and destinations of the two routes; and respective routing resource sequences of the two routes, among other information.

Note that in various embodiments, the routing conflict may include incompatible reservations of a routing resource comprised in each of the two routes, and/or incompatible specified configuration of a routing resource comprised in each of the two routes. In some embodiments, the routing conflict may include specification of incompatible reservations and/or configurations of two or more routing resources comprised in each of the two routes (e.g., as opposed to just one).

In embodiments where information regarding the routing resource itself is determined, e.g., an ID or description of the resource, the error message or report may include identification of the routing resource. In some embodiments, the identification of the routing resource may include identification of a device that includes the routing resource. In yet further embodiments, the error message may include identification of respective tasks associated with the one or more routes, e.g., by name, ID, description, etc., as desired.

BRIEF DESCRIPTION OF THE DRAWINGS

A better understanding of the present invention can be obtained when the following detailed description of the preferred embodiment is considered in conjunction with the following drawings, in which.

Figure 1A:
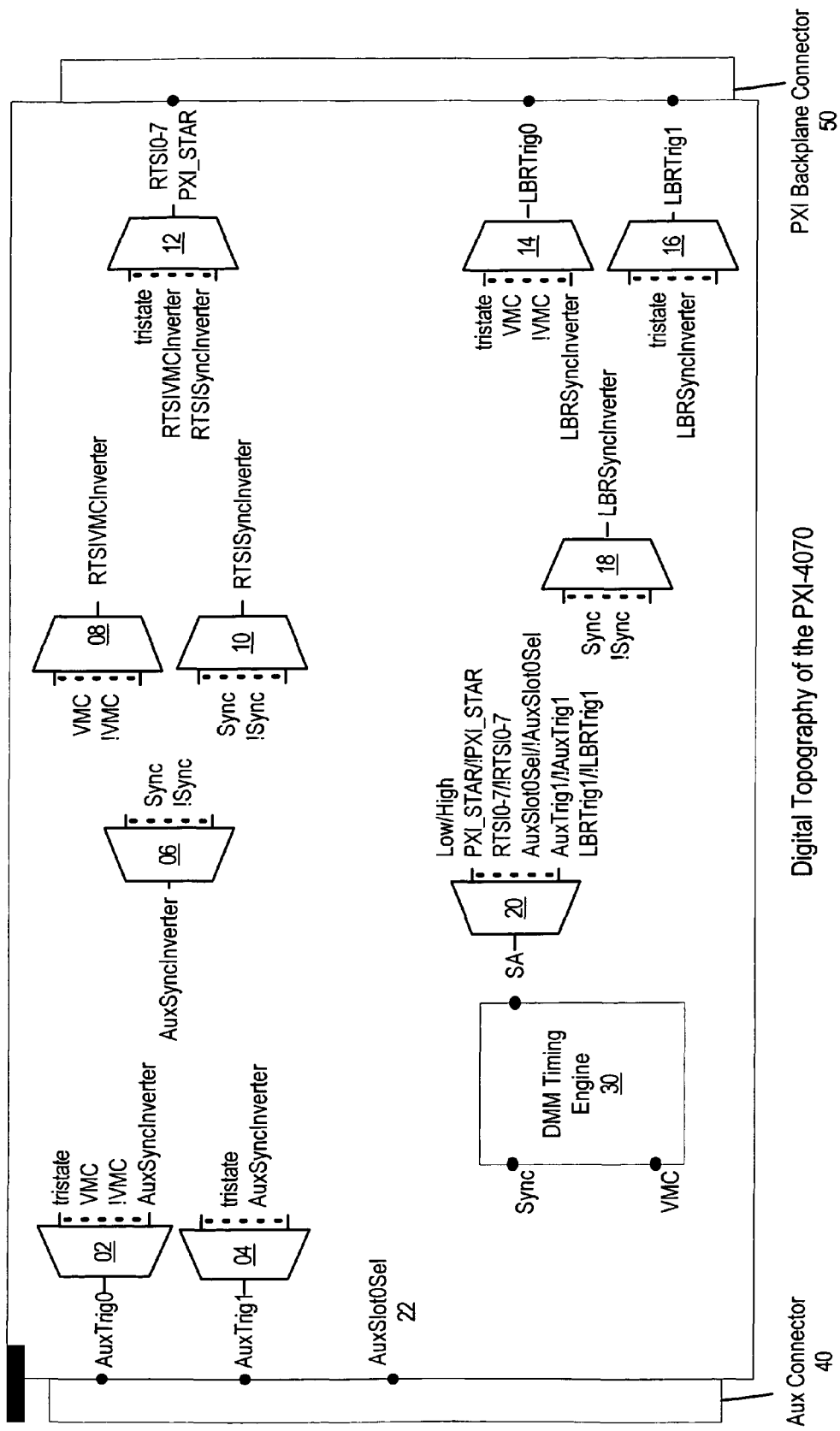
FIG. 1A illustrates topography of a PXI-4070 card from National Instruments Corporation, according to the prior art.
Figure 1B:
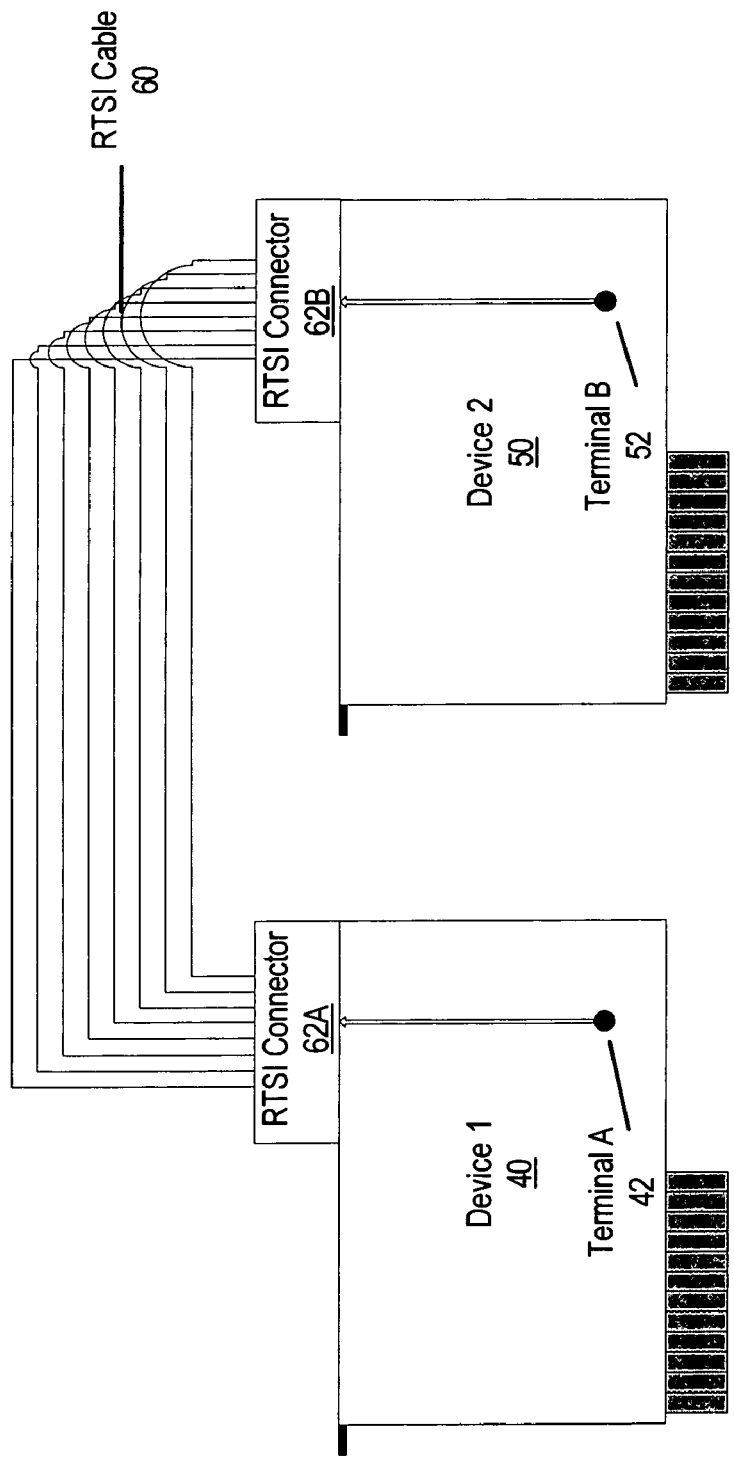
FIG. 1B illustrates one example of routing between multiple devices, according to the prior art.
Figure 2A:
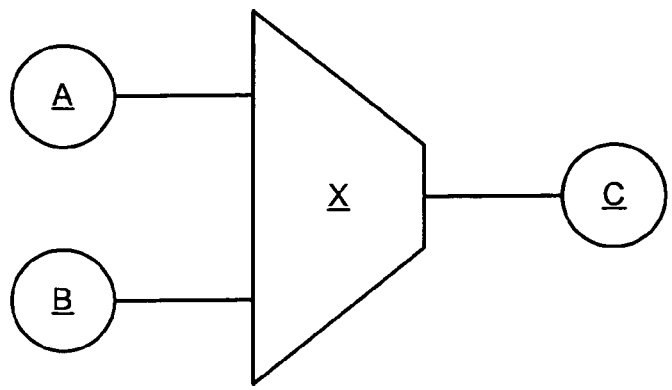
FIGS. 2A-2C illustrate routing restrictions in a simple system, according to the prior art.
Figure 2B:
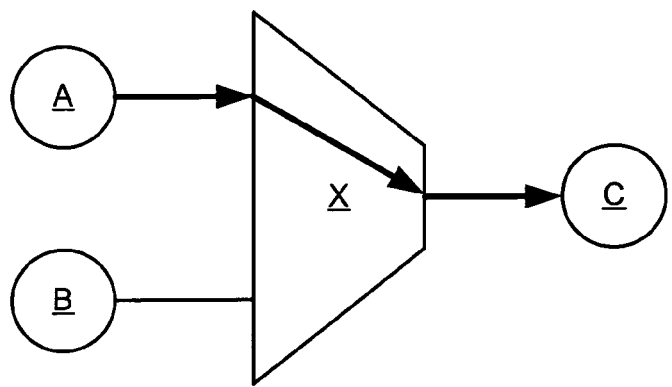
Figure 2C:
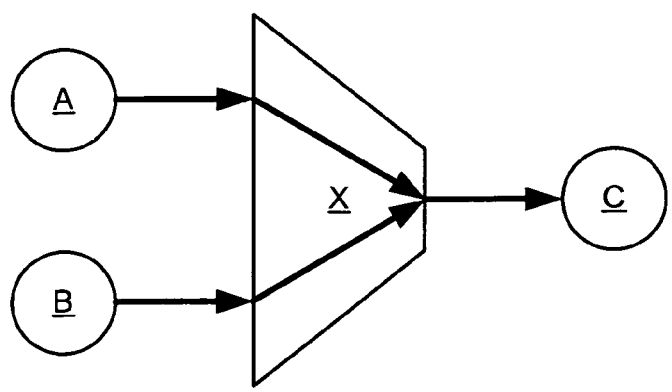

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. patent application Ser. No. 10/174,157, titled "Dynamic Routing for a Measurement System", filed Aug. 30, 2002;

U.S. patent application Ser. No. 10/231,543, titled "Routing with Signal Modifiers in a Measurement System", filed Aug. 30, 2002;

U.S. patent application Ser. No. 10/174,445, titled "Shared Routing in a Measurement System", filed Aug. 30, 2002;

U.S. patent application Ser. No. 10/232,151, titled "Meta-Routing Tool for A Measurement System", filed Aug. 30, 2002.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Connection—a link between a two terminals. Physical manifestation of a connection could be a wire, trace, fiber optic line, or infrared link.

Connectors—a set of pins made to link with a set of sockets or vise versa. Connectors also delineate when one component ends and another component begins. Components are joined to one another using connectors. Connectors allow connection MSOs to propagate across components. Examples of components are boards (PWBs), chips, cables, PXI chassis, and any other component that is reusable. Every component has one or more connectors. If a component is capable of joining with five other components, then the component will have five connectors. Two components can only join with one another if their connectors are compatible. When a connector pin is driven, the pin needs to be reserved so that it cannot be double driven in the future.

Routing Resource—a single, reservable element for routing signals in a system. Examples of routing resources include multiplexers (MUXs), RTSI lines, and I/O terminals.

Route—a route is a connection between two terminals. When the user is setting up a data acquisition, routes may be implicitly created. The user may only be required to know the source or destination of the created connection.

Static Digital Multiplexer—a multiplexer (MUX) which is programmed then used without further modifications. Some switching boards have multiplexers that are dynamic. Digital refers to the fact that the multiplexer is binary and directional. Digital multiplexers can only drive from an input pin to their output pin. Mechanical multiplexers used in switching applications are bi-directional. Digital multiplexers are unidirectional. Static digital multiplexers are used to route one out of a list of discrete list of inputs to its single output.

Terminal—a physical location on a measurement device, cable, terminal block, accessory, or other measurement product where a phenomenon resides. For example, a terminal may be a connector on a terminal block, a pin on an ASIC, or the end of a thermocouple. Said another way, terminals are points on hardware where a signal is present. A terminal may be physically impossible to probe—especially if it is located within a chip.

Terminal Configuration—a collection of terminals with a specified usage. Examples of terminal configurations are referenced single-ended, non-referenced single-ended, two-wire differential, and four-wire excitation.

Topography—a topography may refer to the layout of a component, or to a collection of topographies. A topography has three main sections: 1) a list of terminals; 2) a list of routing resources; and 3) a list of each routing resource's configurations. The variation of these three sections makes topographies customizable and powerful. Topographies may be stored as binary data structures and loaded as needed.

Virtual Measurement Device—a device which is implemented as a software program, or at least a portion of which is implemented as a software program.

Figure 3A:
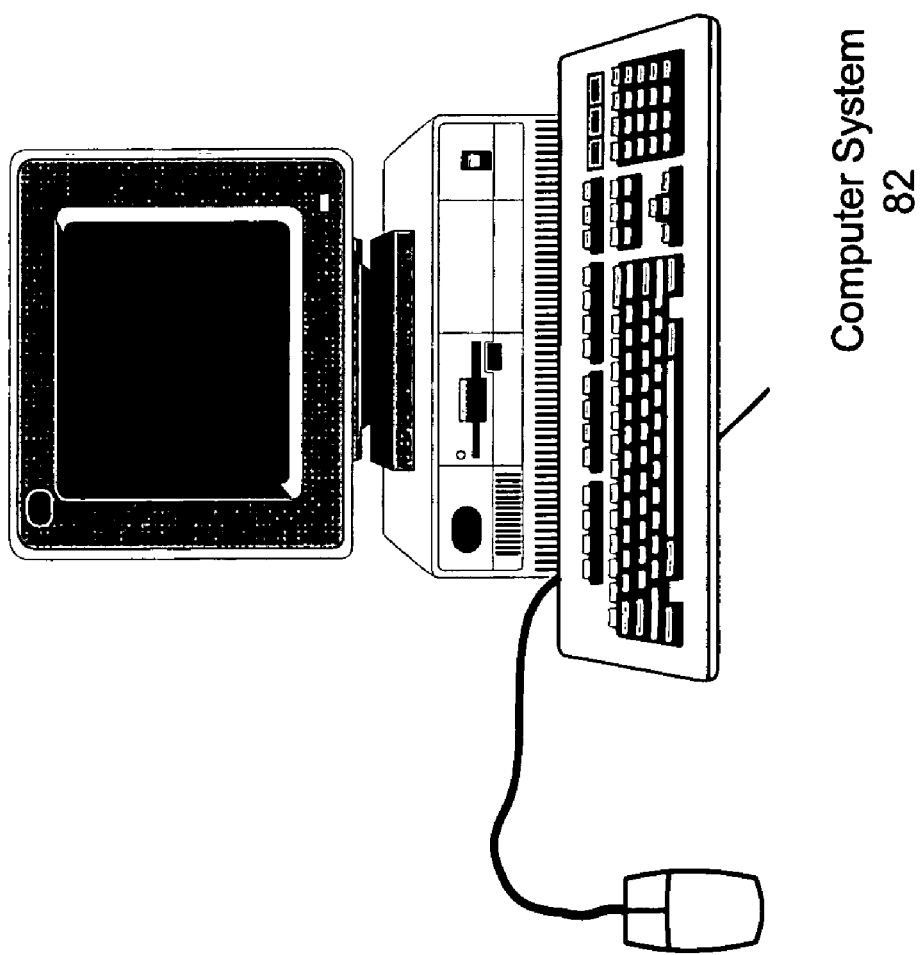
FIG. 3A illustrates a computer system suitable for implementing various embodiments of the present invention.

FIG. 3A—Computer System

FIG. 3A illustrates a computer system 82 operable to execute a program configured to analyze routing in a system, detect routing conflicts, and report routing errors according to various embodiments of the present invention.

As shown in FIG. 3A, the computer system 82 may include a display device operable to display the program as the program is created and/or executed. The display device may also be operable to display a graphical user interface or front panel of the program during execution of the program. The graphical user interface may comprise any type of graphical user interface, e.g., depending on the computing platform.

The computer system 82 may include a memory medium(s) on which one or more computer programs or software components according to one embodiment of the present invention may be stored. For example, in some embodiments, the memory medium may store one or more graphical programs which are executable to perform the methods described herein. Also, the memory medium may store a graphical programming development environment application used to create and/or execute such graphical programs, such as the LabVIEW graphical programming environment provided by National Instruments Corporation. The memory medium may also store operating system software, as well as other software for operation of the computer system. Various embodiments further include receiving or storing instructions and/or data implemented in accordance with the foregoing description upon a carrier medium.

Figure 3B:
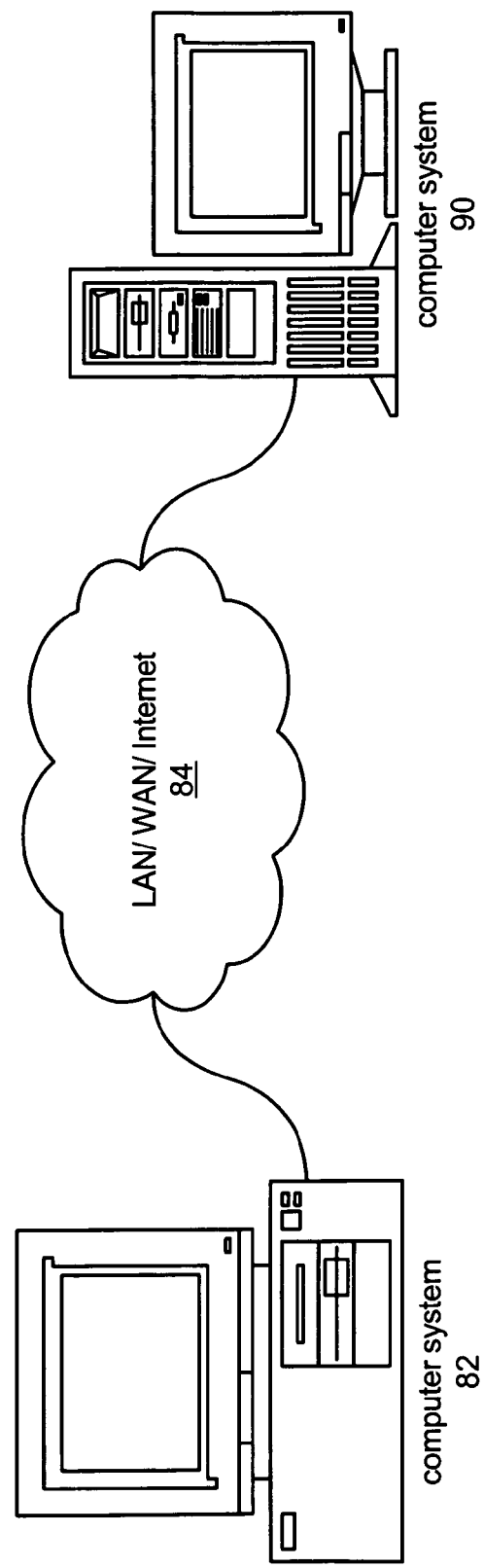
FIG. 3B illustrates a network system comprising two or more computer systems that may implement an embodiment of the present invention.

FIG. 3B—Computer Network

FIG. 3B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program in a distributed fashion. For example, in the case of graphical programs, defined above, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Although embodiments described herein are directed to graphical programs, it should be noted that the techniques disclosed are broadly applicable to any type of routing system, e.g., graphical or text-based routing system programs.

Exemplary Systems

Embodiments of the present invention may be involved with performing design, test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 4A:
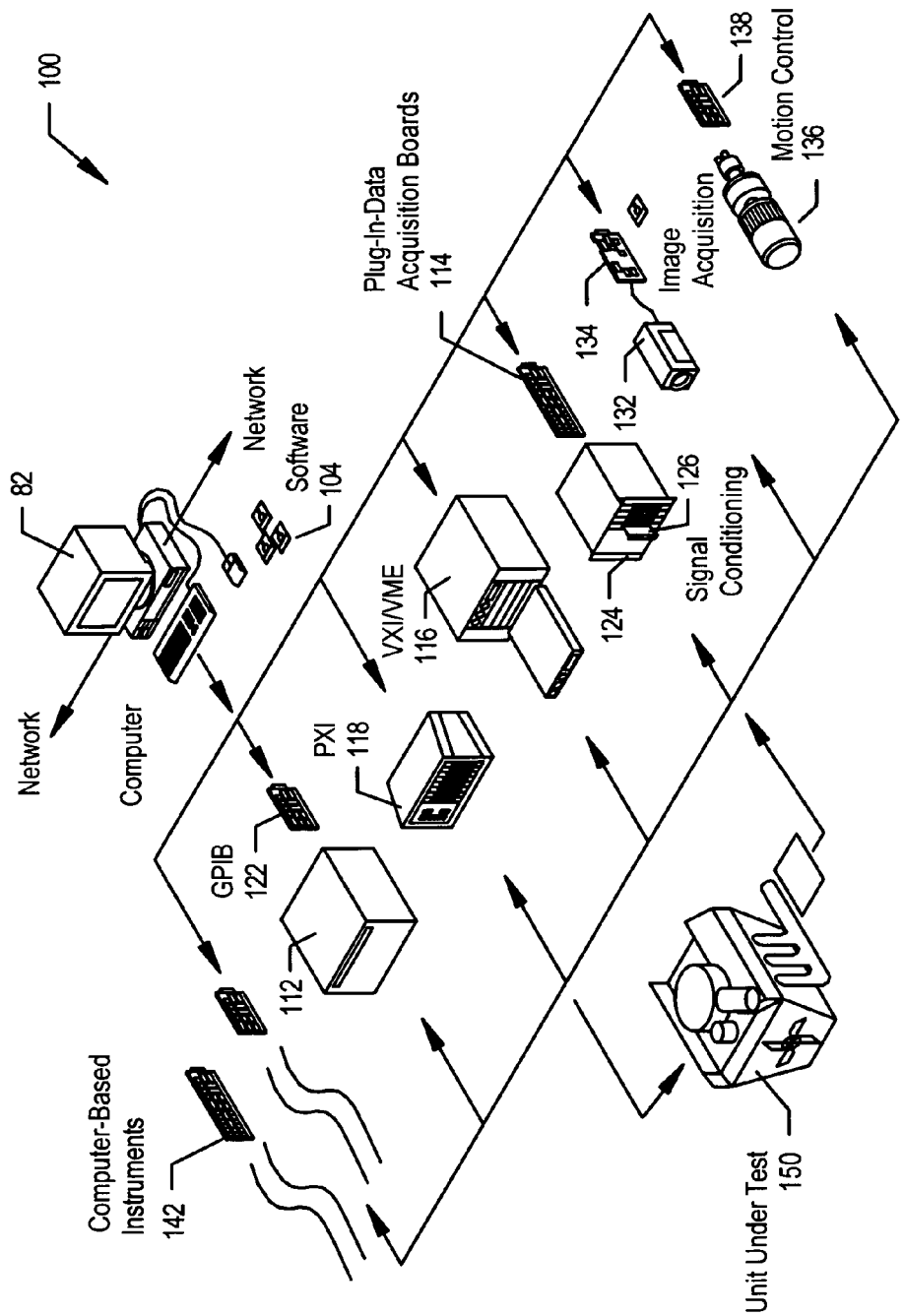
FIG. 4A illustrates an instrumentation control system according to one embodiment of the invention.

FIG. 4A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 4B:
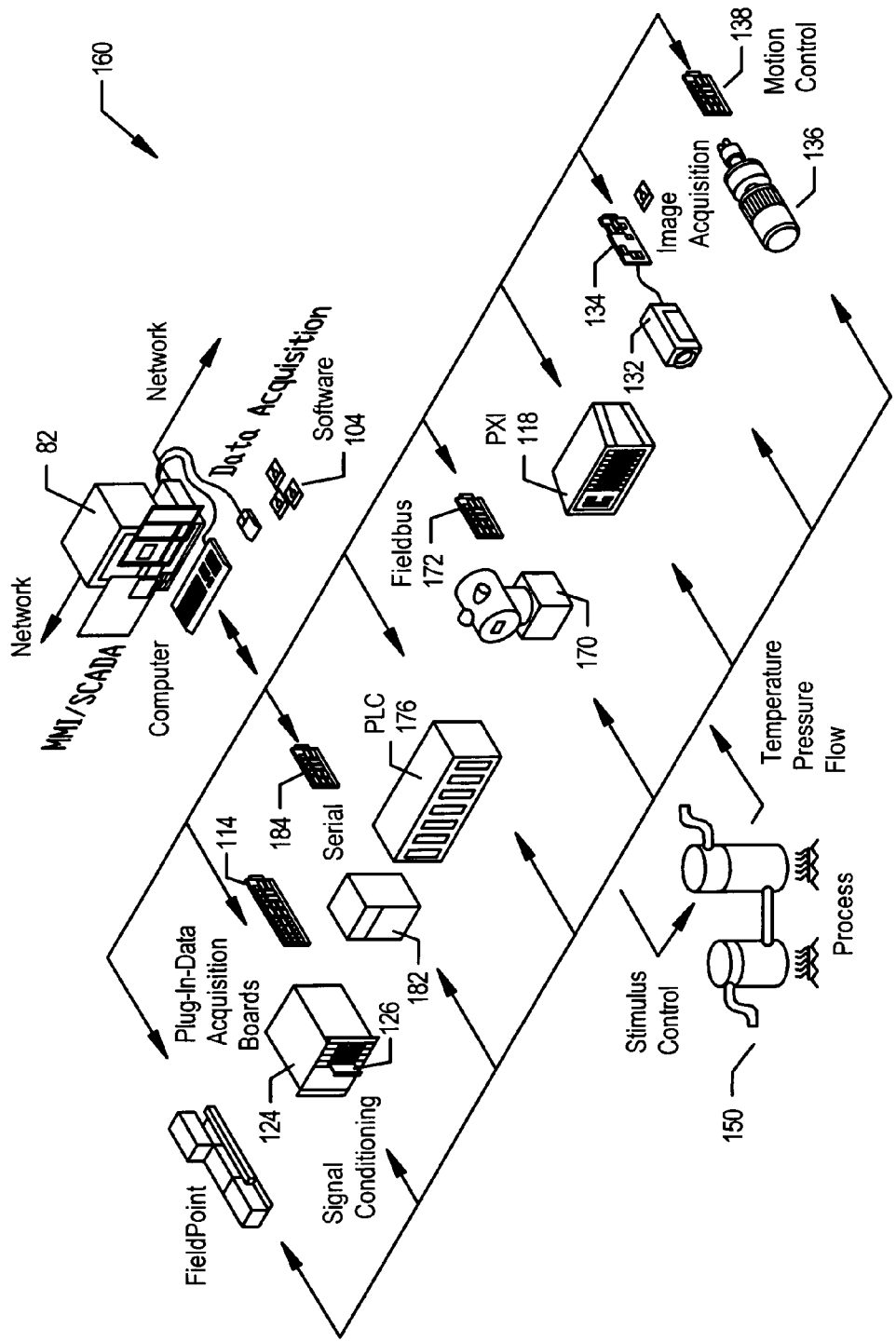
FIG. 4B illustrates an industrial automation system according to one embodiment of the invention.

FIG. 4B illustrates an exemplary industrial automation system 160 which may implement embodiments of the invention. The industrial automation system 160 is similar to the instrumentation or test and measurement system 100 shown in FIG. 4A. Elements which are similar or identical to elements in FIG. 4A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

In the embodiments of FIGS. 4A and 4B above, one or more of the various devices may couple to each other over a network, such as the Internet. In one embodiment, the user operates to select a target device from a plurality of possible target devices for programming or configuration using a program, e.g., a graphical program. Thus the user may create a program on a computer and use (execute) the program on that computer or deploy the program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 4A and 4B, may be referred to as virtual instruments.

Figure 5:
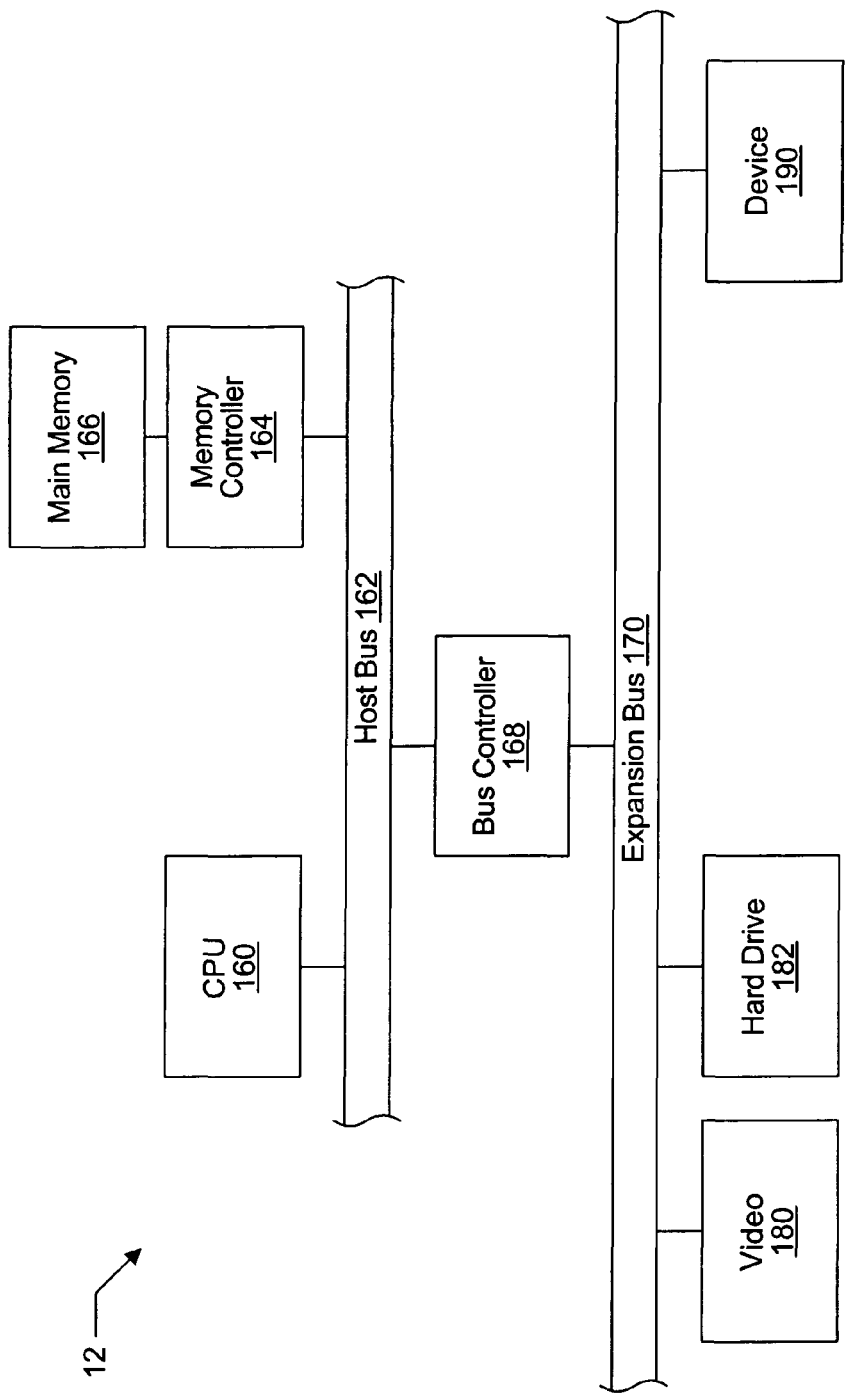
FIG. 5 is an exemplary block diagram of the computer systems of FIGS. 3A, 3B, 4A and 4B.

FIG. 5—Computer System Block Diagram

FIG. 5 is a block diagram representing one embodiment of the computer system 82 and/or 90 illustrated in FIGS. 3A and 3B, or computer system 82 shown in FIG. 4A or 4B. It is noted that any type of computer system configuration or architecture can be used as desired, and FIG. 5 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the one or more programs operable to analyze (and optionally determine) routing in a system, detect routing conflicts, and return error information according to various embodiments of the present invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. As shown, the computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a program, e.g., a graphical program, to the device 190 for execution of the program on the device 190. The deployed program may take the form of graphical program instructions or data structures that directly represents the graphical program. Alternatively, the deployed program may take the form of text code (e.g., C code). In a further embodiment, the program may be text code generated from a graphical program. As another example, the deployed program may take the form of compiled code generated from either the graphical program or from text code that in turn was generated from the graphical program.

Figure 6:
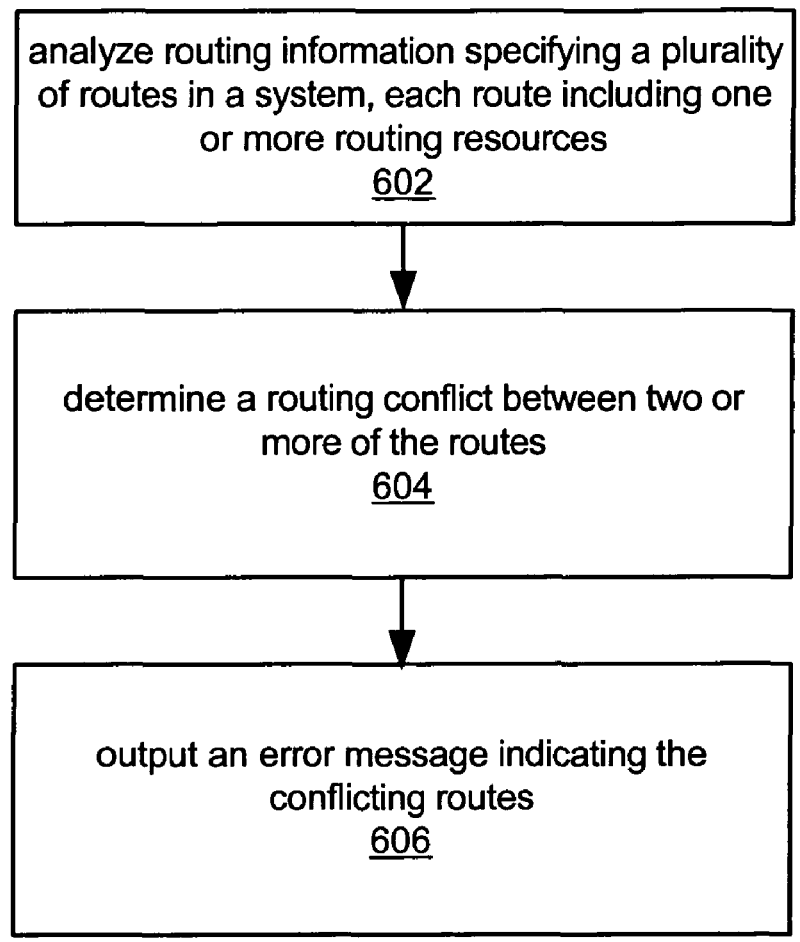
FIG. 6 is a high level flowchart of a method for analyzing routing in a system, according to one embodiment.

FIG. 6—High-level Flowchart of Method for Analyzing Routing

FIG. 6 is a high level flowchart of a method for analyzing routing in a system, according to one embodiment. The method is preferably implemented in software executable by a computing system, e.g., any of the computer systems described above. In various embodiments, some of the method elements shown may be performed concurrently, in a different order than shown, or may be omitted. Additional method elements may also be performed as desired. As shown, this method may operate as follows.

In 602, routing information specifying a plurality of routes in a system may be analyzed. Each route preferably includes one or more routing resources, such as multiplexers (MUXes), I/O terminals, etc. As is well known in the art, each route may have a source and a destination, and may provide a signal communication path from the source to the destination. The system may be comprised on a single device, or the system may include a plurality of interconnected devices, where each of at least a subset of the plurality of routes may extend over two or more of the plurality of interconnected devices. For example, in various embodiments, the system may include or be included in one or more of: an industrial automation system, a process control system, and a test and measurement system, although it should be noted that the techniques disclosed herein are broadly applicable to any application domain, e.g., to any system that utilizes signal routing.

Note that in some embodiments, the routing information may originate from the user, from an auto-routing system, e.g., a routing tool or program, an external system, or any combinations thereof. For example, in one embodiment, an auto-routing tool may determine a plurality of routes in the system, e.g., based on routing requirements for the system, and may provide routing information specifying the routes to the present method, which may then analyze all of the routes. For example, the tool or program may analyze routing requirements for the system, and generate the routing information based on the analysis. In another embodiment, a user may provide the information specifying the plurality of routes, e.g., based on routing requirements for the system.

In a preferred embodiment, the routing information may be provided incrementally. For example, in one embodiment, described in detail below with reference to FIG. 7, the routing information for the system may specify a proposed new route of the plurality of routes in the system, and one or more routes comprising a remainder of the plurality of routes in the system, where the one or more routes are known to be valid. In other words, one or more routes may have been previously specified, e.g., by a user or tool/program, (e.g., and possibly validated), and then a new route specified, e.g., also by a user or program, where the proposed new route is analyzed with respect to the one or more routes in the system.

In 604, a routing conflict between two or more of the routes may be determined based on the analysis of 602. In preferred embodiments, the routing conflict is with respect to a routing resource included in each of the two routes, e.g., specification of incompatible configurations and/or reservations of one or more routing resources comprised in the routes. For example, a MUX may be specified for simultaneous use by two routes, where each route requires the MUX to be configured in a mutually incompatible way, i.e., a single configuration of the MUX may not serve the needs of both routes.

In 606, an error message indicating the conflicting routes may be output, e.g., for display on a display device, logging to a file, etc. The error message preferably includes information identifying the two routes, and is useable in debugging routing for the system.

It should be noted that the techniques described herein may be repeated as needed or desired. For example, one or more additional routing conflicts between additional respective pairs of routes of the plurality of routes may be determined based on the analyzing (e.g., of 602), where each additional routing conflict may include respective specification of incompatible configurations and/or reservations of one or more routing resources comprised in each route of the pair of routes.

A more detailed embodiment of the method is described below with reference to FIG. 7.

Figure 7:
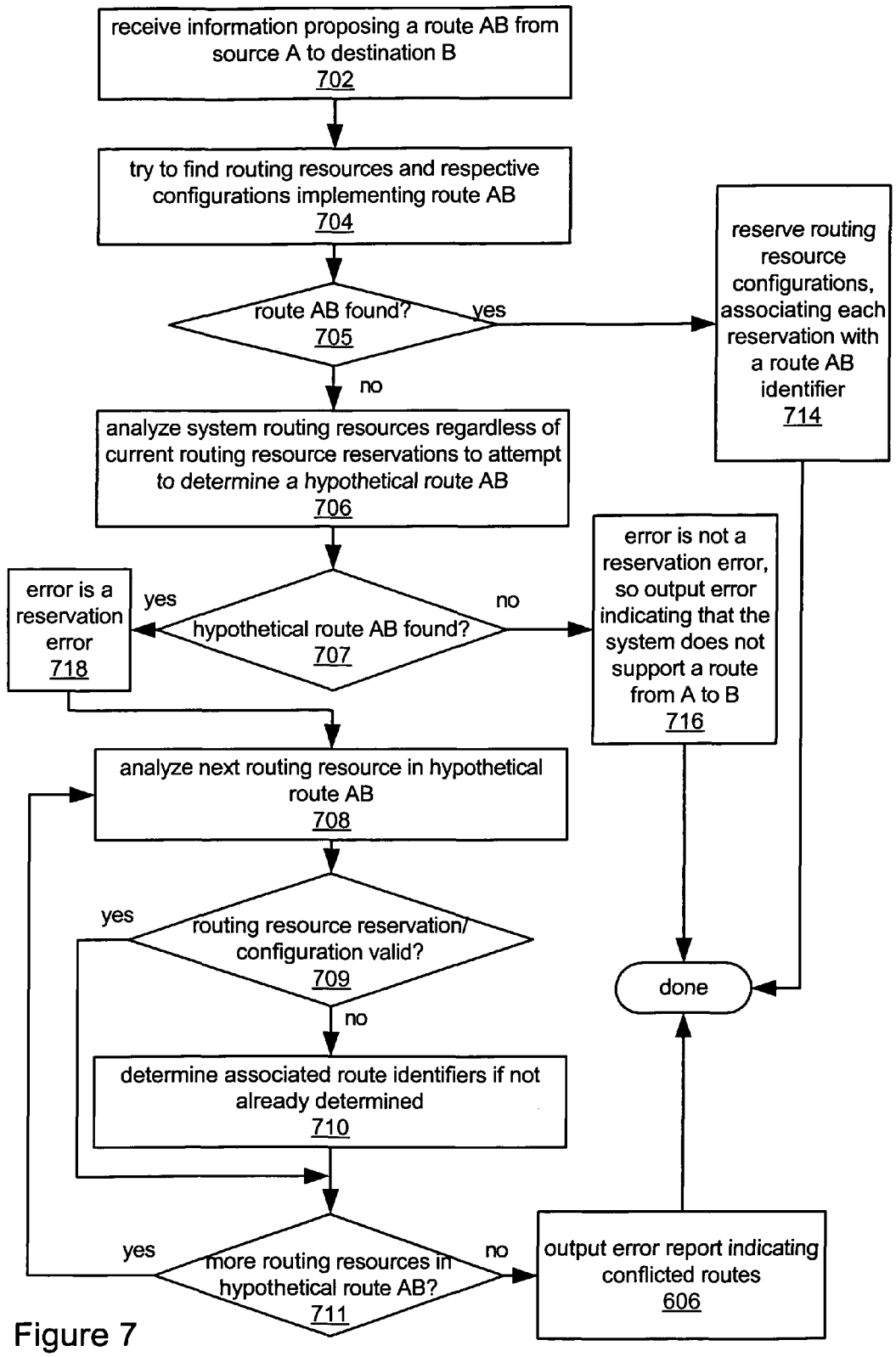
FIG. 7 is a more detailed flowchart of one embodiment of the method of claim 6.

FIG. 7—Detailed Flowchart of Method for Analyzing Routing

FIG. 7 is a more detailed flowchart of one embodiment of the method of FIG. 6, described above. As noted above, the method is preferably implemented in software executable by a computing system. In various embodiments, some of the method elements shown may be performed concurrently, in a different order than shown, or may be omitted. Additional method elements may also be performed as desired. As shown, this method may operate as follows.

In 702, information proposing a route may be received. For example, in one embodiment, information proposing a route AB from source A to destination B in a system may be received, where A and B represent any type of route source and destination, respectively. In one embodiment, the routing information for the system specifies a proposed new route of the plurality of routes in the system, and one or more routes comprising a remainder of the plurality of routes in the system, where the one or more routes are known to be valid.

In other words, as described above with reference to FIG. 6, in one embodiment, one or more routes may have been previously specified, e.g., by a user or tool/program, (e.g., and possibly validated), and then a new route specified, e.g., also by a user or program, where the proposed new route may be analyzed with respect to the one or more routes in the system, as described in detail below.

In one embodiment, the routing information specifying the proposed new route may be based on user input specifying a source and destination for the new route, e.g., source A and destination B.

In 704, an attempt may be made to determine routing resources and respective configurations implementing the proposed route, e.g., route AB. In other words, the various routing resources, e.g., MUXes, I/O terminals, and so forth, of the system may be analyzed to try to determine a communication path from the route source A to the route destination B, where the path includes a sequence of routing resources. Said yet another way, an attempt may be made to find a successful implementation of route AB.

In 705, a determination may be made as to whether the route AB was found, i.e., whether the attempt to determine routing resources and respective configurations implementing the proposed route was successful.

As FIG. 7 shows, if the attempt of 704 was successful, the method may proceed to 714, in which the determined routing resource configurations may be reserved, and each reservation associated with a route identifier for the proposed route, e.g., a route AB identifier, at which point the method may terminate, as shown.

If in 705, it is determined that the attempt of 704 was unsuccessful, i.e., if a successful implementation of the proposed route was not found, then in 706, the system's routing resources may be analyzed regardless of current routing resource reservations to attempt to determine a hypothetical route, e.g., hypothetical route AB.

Thus, in some embodiments, analyzing the proposed new route may include analyzing the routing resources and corresponding configurations of the system without regard to reservation status in order to try to determine a set of routing resources and configurations communicatively coupling the source of the proposed new route to the destination of the proposed new route.

In 707, a determination may be made as to whether hypothetical route AB was found. In other words, i.e., a determination may be made as to whether the attempt to determine routing resources and respective configurations implementing the hypothetical route was successful.

If in 707, it is determined that the attempt of 706 was unsuccessful, i.e., if a successful implementation of the hypothetical route was not found, then, as indicated in 716, the error is not a reservation error, and so an error may be output indicating that the system does not support a route from A to B, and the method may terminate, as indicated.

If in 707, it is determined that the attempt of 706 was successful, i.e., if a successful implementation of the hypothetical route was found, then, as indicated in 718, the error is a reservation error, and the method may proceed to 708, as shown. In other words, if the hypothetical route AB is valid, not taking into account the reservation status of the system's routing resources, then there is a reservation conflict between the proposed route and one or more of the previously specified (and reserved) routes, in which case the routing resources of the hypothetical route (e.g., hypothetical route AB) may be analyzed to determine the nature of the conflict, as described below.

In 708, a next routing resource in hypothetical route AB may be analyzed, and a determination made as to whether the routing resource reservation/configuration is valid, as indicated in 709. For example, the reservation status and configuration of the routing resource may be analyzed, e.g., with respect to the previously specified routes' reservation statuses and configurations, to determine if reserving and configuring the routing resource for inclusion in the hypothetical route AB would be in conflict (or not) with that resource's reservation status and configuration with respect to any other route that includes the resource.

If the routing resource reservation/configuration is found to be valid (in 709), then the method may proceed to 711, described below, since that routing resource was not the cause of the error or conflict.

If, however, the routing resource reservation/configuration is found to be invalid (in 709), then the method may proceed to 710, as shown.

In 710, associated route identifiers for the routing resource may be determined, if not already determined. In other words, any routes that already include the routing resource may be identified. In some embodiments, information regarding the routing resource itself may also be determined, e.g., identification information, e.g., an ID or description of the resource may be determined. In preferred embodiments, the associated route identifiers (and optionally the resource identification or description) may be stored for subsequent reference.

In 711, if there are more routing resources in the hypothetical route AB to analyze, then the method may proceed to 708, and continue as described above, i.e., analyzing the next routing resource of hypothetical route AB.

If in 711, it is determined that there are no further routing resources in the hypothetical route to analyze, the method may proceed to 606, where, as indicated, an error message indicating the conflicting routes may be output, e.g., for display on a display device, logging to a file, etc., and the method terminated, as shown. The error message preferably includes information identifying the two routes, and is useable in debugging routing for the system.

Thus, summarizing 708, 709, 710, and 711, in some embodiments, determining a routing conflict between two routes of the plurality of routes may include: for each routing resource and corresponding configuration of the set of routing resources and configurations communicatively coupling the source of the proposed new route to the destination of the proposed new route, if the routing resource is configured in an incompatible manner with respect to the one or more routes comprising the remainder of the plurality of routes in the system, identifying the routing resource as a conflicted resource, and storing a route identifier of the routing resource, where the identification of the two routes included in the error message may be based on the stored route identifier(s) of the conflicted routing resource.

In some embodiments, identification of the two routes may include: respective names of the two routes; respective sources and destinations of the two routes; and/or respective routing resource sequences of the two routes, among other information.

Note that in various embodiments, the routing conflict may include incompatible reservations of a routing resource comprised in each of the two routes, and/or incompatible specified configuration of a routing resource comprised in each of the two routes. In some embodiments, the routing conflict may include specification of incompatible reservations and/or configurations of two or more routing resources comprised in each of the two routes (e.g., as opposed to just one).

In some embodiments, the method may consider or look for more than one hypothetical route AB. For example, if the method determines that at least one hypothetical route AB exists, the routing resources for each hypothetical route may be analyzed as described above. In one embodiment, once the resources for each hypothetical route have been analyzed, a "best" hypothetical route may be determined based on one or more specified metrics, e.g., least errors, simplest errors, route efficiency, and so forth, as desired.

In embodiments where information regarding the routing resource itself is determined (see 710 above), e.g., an ID or description of the resource, the error message or report may include identification of the routing resource. In some embodiments, the identification of the routing resource may include identification of a device that includes the routing resource.

In yet further embodiments, the error message may include identification of respective tasks associated with the one or more routes, e.g., by name, ID, description, etc., as desired.

FIGS. 8-10C—Example Implementations

FIGS. 8-10C illustrate exemplary implementations of one embodiment of the present invention, and compare an example error message with a prior art error message.

Figure 8:
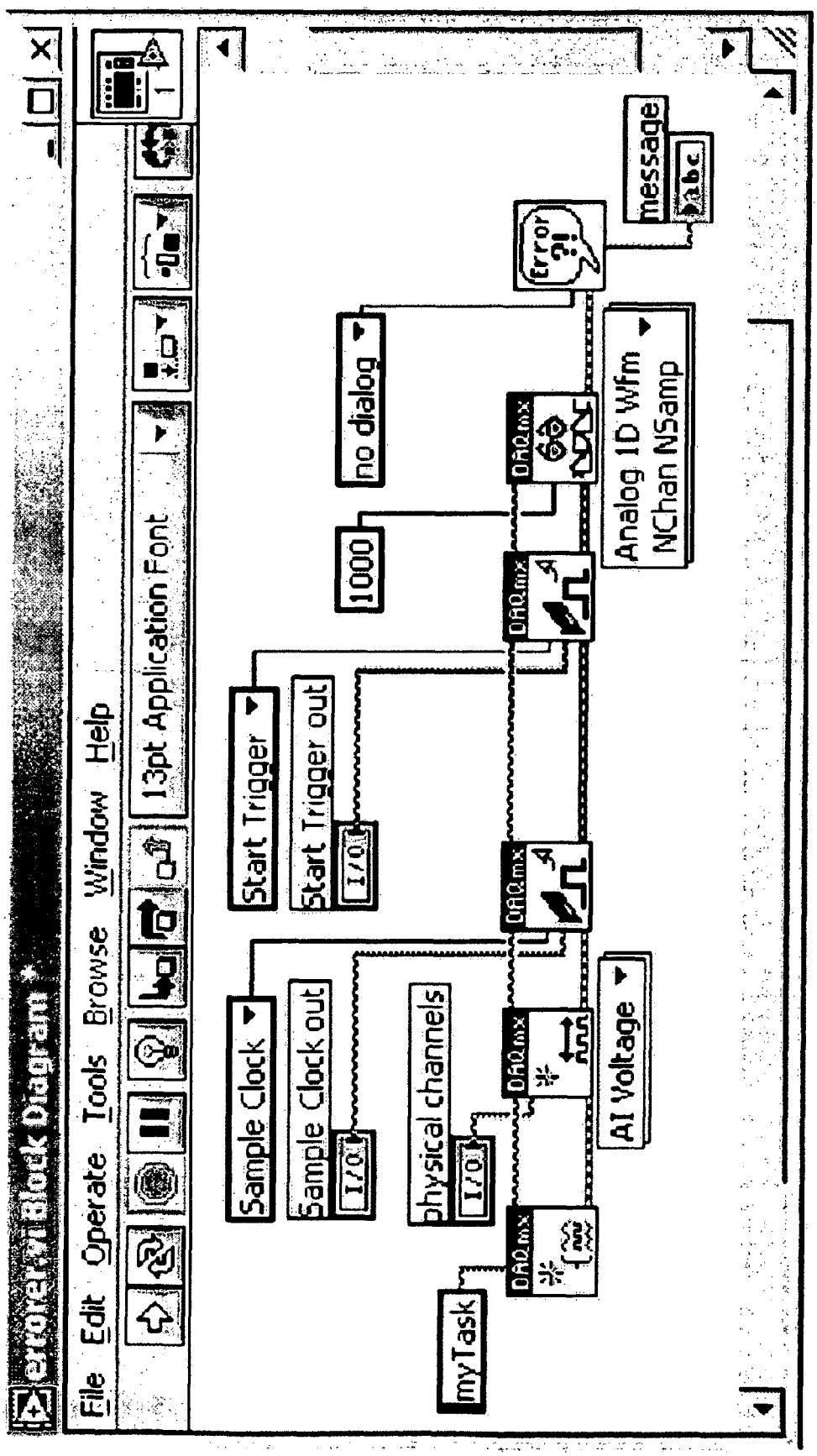
FIG. 8 illustrates an exemplary block diagram or graphical program that uses a routing system, according to one embodiment.

FIG. 8 illustrates an exemplary block diagram, e.g., a graphical program, which uses a routing system. The block diagram shown in FIG. 8 was written using the LabVIEW graphical programming system provided by National Instruments Corporation, although any other type of program development system may be used as desired. More specifically, the program is based on LabVIEW 7.1, using NI-DAQmx 7.3. The block diagram may be written or specified by a user (or tool) to perform a task, i.e., to accomplish some goal. Similarly, although in this example a graphical program is used, it should be noted that any other type of program may be used as desired.

Many of the details of the block diagram are not relevant to the present invention, and so for brevity, the description provided only addresses those aspects that may be germane. As FIG. 8 shows, the user has named his task "myTask". Also, note the areas labeled "Sample Clock out" and "Start Trigger out", which is where the user specifies the destinations for two routes. In this particular case, the user has entered "/Dev1/PFI4" for each, corresponding to these two routes:

source: ai/StartTrigger, destination: /Dev1/PFI4 source: ai/SampleClock, destination: /Dev1/PFI4

When the program is run, it tries to reserve everything it needs, but fails, because the two routes require some of the same resources. Thus, in one embodiment, whichever route reserves the resource first may prevent the other route from reserving that resource.

Figure 9A:
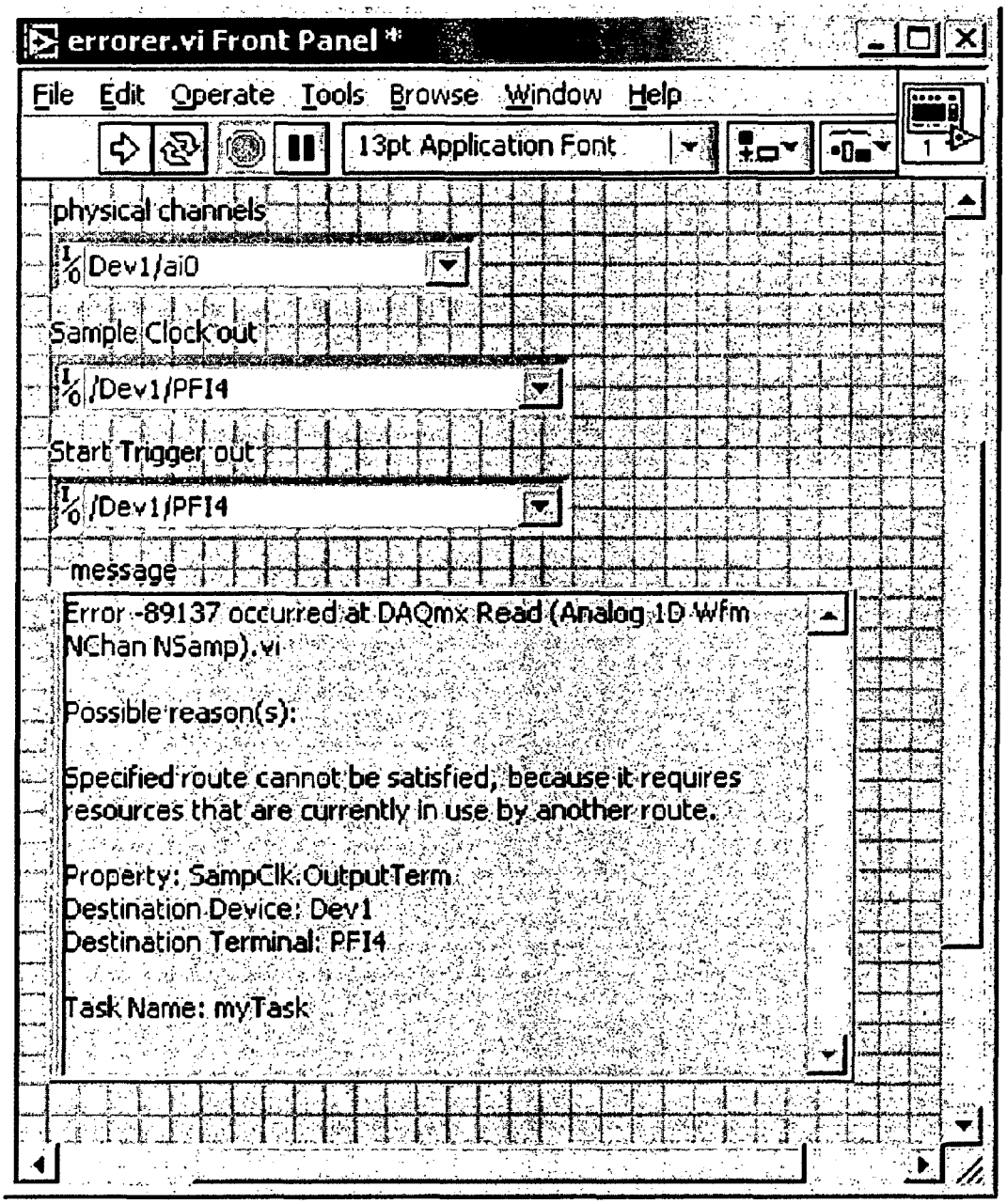
FIG. 9 illustrates an example prior art error message that may be output after the program of FIG. 8 is run once, according to one embodiment.

FIG. 9A illustrates an example prior art error message that may be output after the program is run once. Note that in this example, the error message is displayed in a front panel associated with the block diagram of FIG. 8, where the front panel and the block diagram together comprise a graphical program. The resulting error is presented in the field labeled "message", indicating that the "Specified route cannot be satisfied, because it requires resources that are currently in use by another route", and providing information regarding the source (Sample Clock), and destination (Destination Device: Dev1, and Destination Terminal: PFI4). The text of the error is true, but not very helpful. For example, an experienced user may think "My destination for 'Sample Clock' didn't work because some other route is using hardware I need. Which route is using that hardware? Is it a route I have direct control over? Do I need a more versatile device? Can I change something about my program to fix the problem? What should I change?" This example is quite simple, and so the user's questions may be answered quickly. In more complicated cases, e.g., involving multiple tasks, the user would likely still have much debugging to do.

Figure 9B:
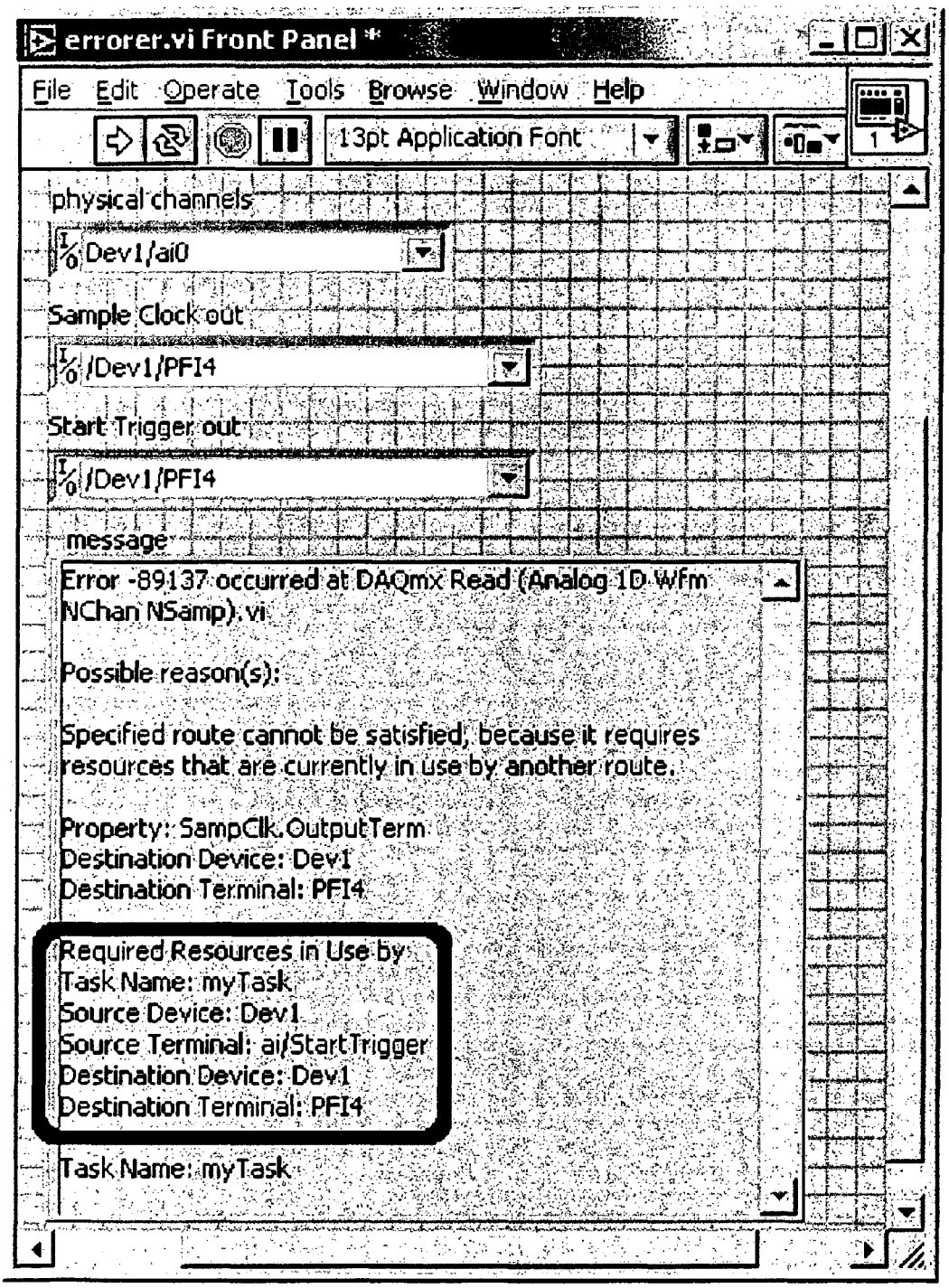

FIG. 9B illustrates an error message for the block diagram of FIG. 8, according to one embodiment of the present invention. Again, the error message is presented on the front panel of the graphical program, although in this case, the error message contains more helpful information, specifically, the information describing the attempted route, as provided by the prior art message of FIG. 9A, plus additional information indicating the conflicting route. In this example, the additional information is indicated by the rounded rectangle, and (in this particular example) includes information indicating that required resources are in use by a route that corresponds to "myTask", with source device "Dev1", source terminal "ai/StartTrigger, destination device "Dev1", and destination terminal "PFI4".

An experienced user might then think "My destination for 'Sample Clock' didn't work because of my destination for 'Start Trigger'. Which one of these two routes should I change?"

Thus, the user may have substantially less debugging to do to understand and resolve the routing conflict. While the improvement may save only a little time in this simple example, the benefit is substantial with complicated programs.

It should be noted that the two routes to "/Dev1/PFI4" are represented differently internally, and so the names do not match up perfectly with those shown on the block diagram. For example, the "Sample Clock" signal corresponds to the "SampClk.OutputTerm" property. The "Start Trigger" signal corresponds to the source terminal "ai/StartTrigger" on device "Dev1". In a different implementation, the user may interact more directly with the routing system.

Figure 10A:
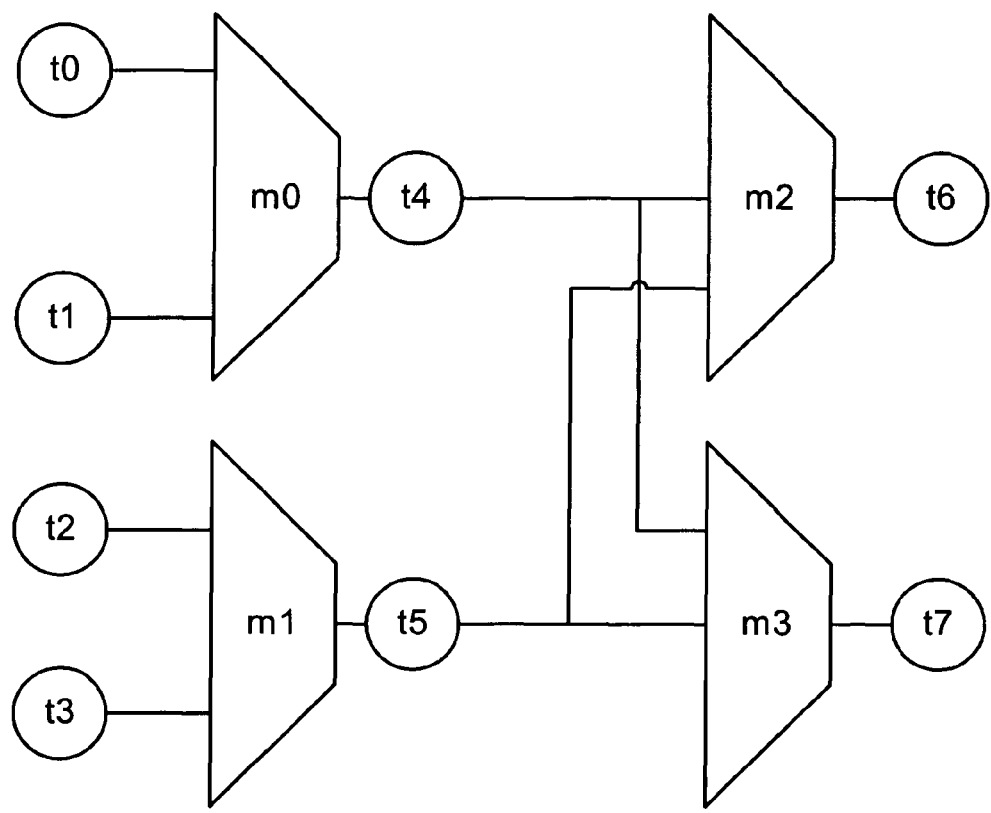
FIGS. 10A-10C illustrate a simple system (e.g., a device) where the configurable resources are multiplexers, according to one embodiment.
Figure 10B:
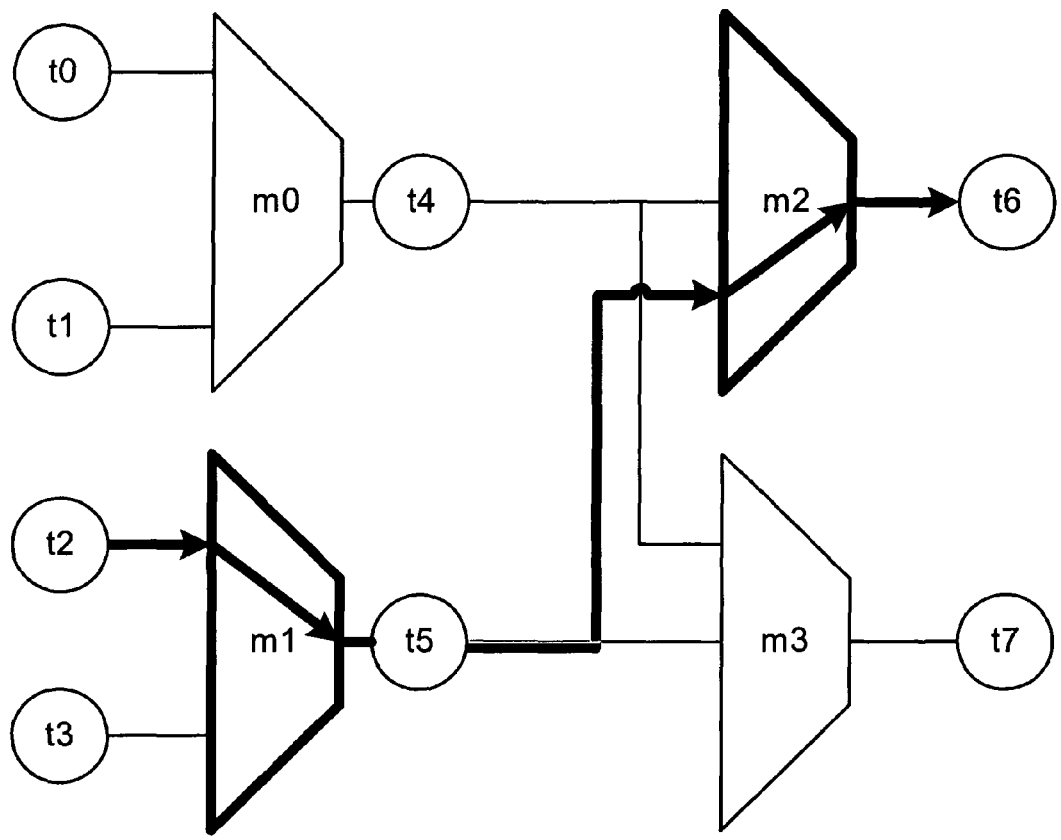
Figure 10C:
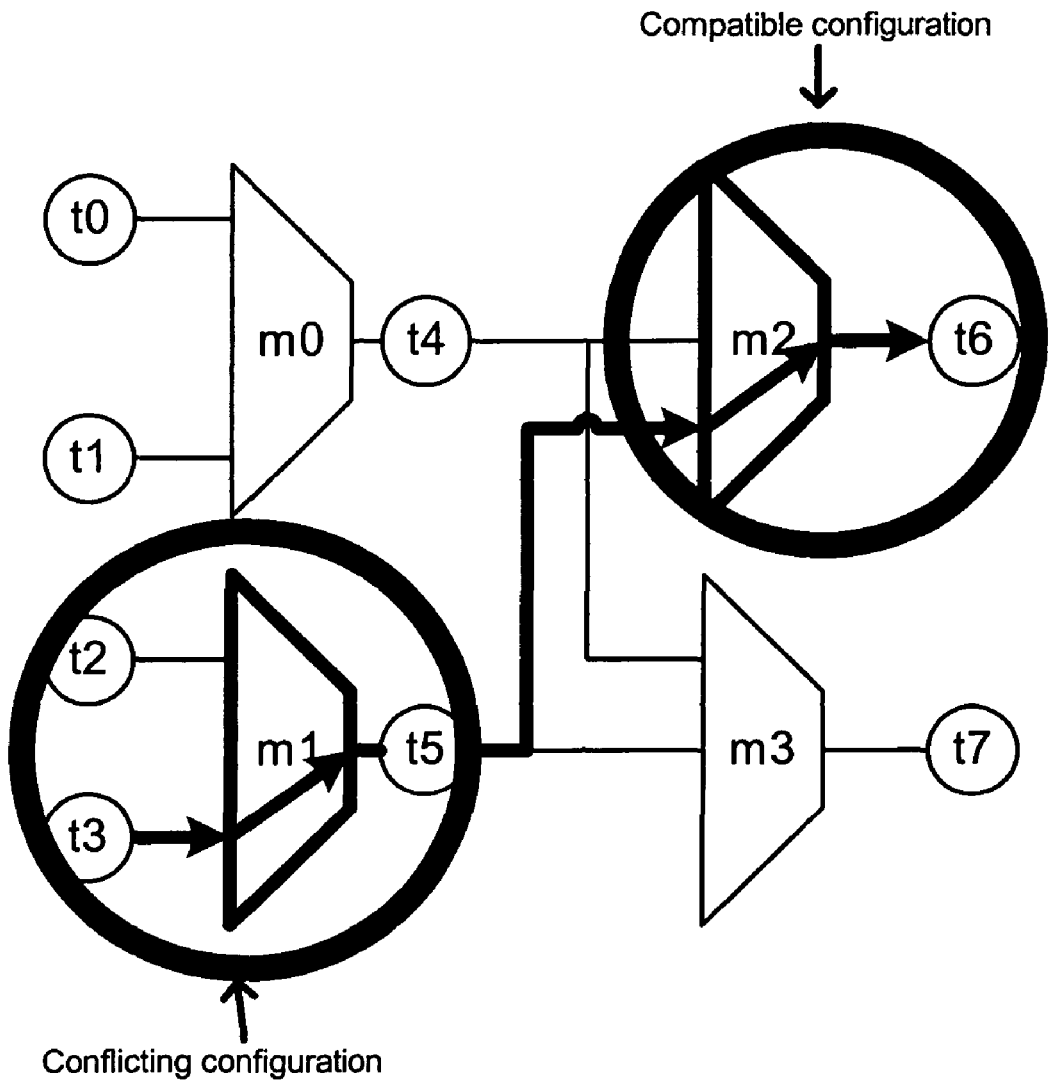

FIGS. 10A-10C illustrate a simple system (e.g., a device) where the configurable resources are multiplexers. Each multiplexer has some possible inputs and one output. One multiplexer's output can be another's input. A route can go through multiple multiplexers. More specifically, the system of FIGS. 10A-10C has four multiplexers, MUXes m0 through m3, each with two possible configurations, where the system includes a plurality of possible routes between terminals t0 through t7, through MUXes m0 through m3. As FIG. 10A shows, terminals t0-t3 can each be routed (connected) to terminals t4-t7 by configuring various combinations of MUXes m0-m3.

Note that in FIGS. 10A-10C, thin lines represent potential configurations, while thick lines denote reserved configurations. MUXes drawn with thin lines are not reserved, while those drawn with thick lines are reserved. Thus, as FIG. 10A indicates, at this point, no route is reserved.

Now, assume that the user wants to route from t2 to t6. The routing system finds a way to do this and reserves routing resources as indicated in FIG. 10B. Thus, FIG. 10B illustrates a successful route, using two out of four possible resources of the simple system of FIG. 10A. Said another way, the user has reserved a route (this line) from terminal t2 to terminal t6, in task "myTask". Multiplexers m1 and m2 are reserved, each with a specific configuration.

The current set of reservations reflecting the route from t2 to t6 may be described by the following:

m0's configuration: not reserved
m1's configuration: reserved with t2 input
m2's configuration: reserved with t5 input
m3's configuration: not reserved Next, assume that the user specifies a route from t3 to t6. This fails. The system may then try to find what a route from t3 to t6 would require if there were no previous reservations to consider, e.g., the hypothetical route described above with respect to FIG. 7. The system determines that such a route is possible.

FIG. 10C illustrates the hypothetical route from t3 to t6 and associated routing resources. As mentioned above, thick lines are used to denote reserved configurations while thin lines are used to denote possible, i.e., potential or unreserved configurations.

It may be seen that this hypothetical route will fail because it conflicts with the first route (of FIG. 10B).

The hypothetical route from t3 to t6 requires these configurations:

m1's configuration needs to be t3
m2's configuration needs to be t5

An explanation for why the route from t3 to t6 failed may then be constructed. In preferred embodiments, the explanation (an error message) may be constructed incrementally, e.g., may be "built up", e.g., as analysis of the routes proceeds.

For example, in one embodiment, a simple error may be constructed indicating that the route failed because it required resources in use by another route. Next, the method may analyze each resource in the hypothetical route, as described above with reference to FIG. 7.

The hypothetical route requires m1 to have an input of t3; however, m1 is reserved with an input of t2. This is a conflict, as indicated in FIG. 10C, so the method may add the descriptive information associated with m1's reservation to the overall description of the conflict. The hypothetical route also requires m2 to have an input of t5. MUX m2 is reserved with an input of t5. This is not a conflict, as also indicated in FIG. 10C, and so no additional information is added to the description.

Now, each resource in the hypothetical route has been considered, and so the reservation conflicts have all been detected. The conflicts may then be described to the user in a convenient form, e.g., "A route from t2 to t6", with the conflict descriptions added to the error message. The error may then be reported to the user, and the user can use this information to debug the problem more easily than without this additional information.

Thus, embodiments of the present invention may substantially aid in the analysis and debugging of routing in a system.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for analyzing routing in a measurement system, comprising:

analyzing routing information for a measurement system, wherein the routing information specifies a plurality of routes in the measurement system, wherein each route comprises one or more routing resources in the measurement system, and wherein at least one of the plurality of routes specifies a signal path between a measurement device and a transducer configured to perform a measurement on a unit under test (UUT) to acquire a signal;

determining a routing conflict between two routes of the plurality of routes based on said analyzing, wherein the routing conflict comprises incompatible reservations of a routing resource comprised in each of the two routes, wherein the routing resource comprises a multiplexer (MUX); and outputting an error message indicating the routing conflict, wherein the error message comprises:

identification of the two routes, comprising:
respective names of the two routes; and
respective sources and destinations of the two routes;
respective routing resource sequences of the two routes;
identification of the routing resource; and
identification of respective tasks associated with the two routes;

wherein the error message is useable in debugging routing for the measurement system.

2. The method of claim 1, wherein the identification of the respective tasks comprises one or more of:
name, ID, or description of the respective tasks.

3. The method of claim 1,
wherein the routing information for the measurement system specifies:
a proposed new route of the plurality of routes in the measurement system; and
one or more routes comprising a remainder of the plurality of routes in the measurement system, wherein the one or more routes are known to be valid; and
wherein said analyzing routing information for the measurement system comprises:
analyzing the proposed new route with respect to the one or more routes in the measurement system.

4. The method of claim 3, wherein the routing information specifying the proposed new route is based on user input specifying a source and destination for the new route.

5. The method of claim 3, wherein the routing information specifying the one or more routes comprising a remainder of the plurality of routes is based on user input.

6. The method of claim 3, wherein the error message further comprises:
identification of respective tasks associated with the one or more routes.

7. The method of claim 3, further comprising:
analyzing routing requirements for the measurement system; and
generating the routing information based on said analyzing routing requirements for the measurement system.

8. The method of claim 3, wherein the proposed new route comprises a source and a destination, and wherein said analyzing the proposed new route with respect to the one or more routes in the measurement system comprises:
analyzing the routing resources and corresponding configurations of the measurement system without regard to reservation status to determine one or more sets of routing resources and configurations communicatively coupling the source of the proposed new route to the destination of the proposed new route.

9. The method of claim 8, wherein said determining a routing conflict between two routes of the plurality of routes comprises:
for each of the one or more sets of routing resources and configurations communicatively coupling the source of the proposed new route to the destination of the proposed new route,
for each routing resource and corresponding configuration of the set:
if the routing resource is configured in an incompatible manner with respect to the one or more routes comprising the remainder of the plurality of routes in the measurement system, identifying the routing resource as a conflicted resource, and storing a route identifier of the routing resource;
wherein said identification of the two routes comprised in the error message is based on the stored route identifier of the conflicted routing resource.

10. The method of claim 1, wherein the routing conflict comprises incompatible specified configuration of a routing resource comprised in each of the two routes.

11. The method of claim 1, wherein the measurement system comprises a plurality of interconnected measurement devices, and wherein each of at least a subset of the plurality of routes extends over two or more of the plurality of interconnected devices.

12. The method of claim 11, wherein the device that includes the routing resource comprises a measurement device.

13. The method of claim 1, wherein the routing conflict comprises specification of incompatible reservations and/or configurations of two or more routing resources comprised in each of the two routes.

14. The method of claim 1, the method further comprising:
determining one or more additional routing conflicts between additional respective pairs of routes of the plurality of routes based on said analyzing, wherein each additional routing conflict comprises respective specification of incompatible configurations of one or more routing resources comprised in each route of the pair of routes.

15. The method of claim 1, wherein the measurement system further comprises one or more of:
an industrial automation system;
a process control system; or
a test and measurement system.

16. A non-transitory computer-readable medium that stores program instructions for analyzing routing in a measurement system, wherein the program instructions are computer-executable to perform:
analyzing routing information for a measurement system, wherein the routing information specifies a plurality of routes in the measurement system, wherein each route comprises one or more routing resources in the measurement system, and wherein at least one of the plurality of routes specifies a signal path between a measurement device and a transducer configured to perform a measurement on a unit under test (UUT) to acquire a signal;
determining a routing conflict between two routes of the plurality of routes based on said analyzing, wherein the routing conflict comprises incompatible reservations of a routing resource comprised in each of the two routes, wherein the routing resource comprises a multiplexer (MUX); and
outputting an error message indicating the routing conflict, wherein the error message comprises:
identification of the two routes, comprising: respective names of the two routes; and respective sources and destinations of the two routes; respective routing resource sequences of the two routes;
identification of the routing resource; identification of a device that includes the routing resource; and identification of respective tasks associated with the two routes;
wherein the error message is useable in debugging routing for the measurement system.

17. A system for analyzing routing in a measurement system, comprising:
a processor; and
a memory medium coupled to the processor wherein the memory medium stores program instructions executable by the processor to:
analyze routing information for a measurement system, wherein the routing information specifies a plurality of routes in the measurement system, wherein each route comprises one or more routing resources in the measurement system, and wherein at least one of the plurality of routes specifies a signal path between a measurement device and a transducer configured to perform a measurement on a unit under test (UUT) to acquire a signal;
determine a routing conflict between two routes of the plurality of routes based on said analyzing, wherein the routing conflict comprises incompatible reservations of a routing resource comprised in each of the two routes, wherein the routing resource comprises a multiplexer (MUX); and output an error message indicating the routing conflict, wherein the error message comprises:

identification of the two routes, comprising: respective names of the two routes; and respective sources and destinations of the two routes; respective routing resource sequences of the two routes; identification of the routing resource;

identification of a device that includes the routing resource; and identification of respective tasks associated with the two routes;

wherein the error message is useable in debugging routing for the measurement system.

18. A system for analyzing routing in a measurement system, comprising:

means for analyzing routing information for a measurement system, wherein the routing information specifies a plurality of routes in the measurement system, and wherein each route comprises one or more routing resources in the measurement system, and wherein at least one of the plurality of routes specifies a signal path between a measurement device and a transducer configured to perform a measurement on a unit under test (UUT) to acquire a signal;

means for determining a routing conflict between two routes of the plurality of routes based on said analyzing, wherein the routing conflict comprises incompatible reservations of a routing resource comprised in each of the two routes, wherein the routing resource comprises a multiplexer (MUX); and means for outputting an error message indicating the routing conflict, wherein the error message comprises:

identification of the two routes, comprising: respective names of the two routes; and respective sources and destinations of the two routes; respective routing resource sequences of the two routes; identification of the routing resource; identification of a device that includes the routing resource; and identification of respective tasks associated with the two routes;

wherein the error message is useable in debugging routing for the measurement system.

19. A non-transitory computer-readable medium that stores program instructions for analyzing routing in a measurement device, wherein the program instructions are computer-executable to perform:

analyzing routing information for the measurement device, wherein the routing information specifies a plurality of routes in the measurement device, wherein each route comprises one or more routing resources in the measurement device, and wherein at least one of the plurality of routes specifies a signal path for acquiring a signal from a transducer configured to perform a measurement on a unit under test (UUT);

determining a routing conflict between two routes of the plurality of routes based on said analyzing, wherein the routing conflict comprises incompatible reservations of a routing resource comprised in each of the two routes, wherein the routing resource comprises a multiplexer (MUX); and outputting an error message indicating the routing conflict, wherein the error message comprises:

identification of the two routes, comprising: respective names of the two routes; and respective sources and destinations of the two routes; respective routing resource sequences of the two routes; identification of the routing resource; identification of a device that includes the routing resource; and identification of respective tasks associated with the two routes;

wherein the error message is useable in debugging routing for the measurement system.

20. The non-transitory computer-readable medium of claim 19, wherein the routing information for the measurement device specifies:

a proposed new route of the plurality of routes in the measurement device; and one or more routes comprising a remainder of the plurality of routes in the measurement device, wherein the one or more routes are known to be valid; and wherein said analyzing routing information for the measurement device comprises:

analyzing the proposed new route with respect to the one or more routes in the measurement device.

21. The non-transitory computer-readable medium of claim 20, wherein the proposed new route comprises a source and a destination, and wherein said analyzing the proposed new route with respect to the one or more routes in the measurement device comprises:

analyzing routing resources and corresponding configurations of the measurement device without regard to reservation status to determine one or more sets of routing resources and configurations communicatively coupling the source of the proposed new route to the destination of the proposed new route.

22. The non-transitory computer-readable medium of claim 19, wherein the routing conflict comprises specification of incompatible reservations or configurations of two or more routing resources comprised in each of the two routes.

23. The method of claim 1, wherein the routing resources comprise multiplexers (MUXes).

24. The method of claim 1, wherein the routes are comprised in a single measurement device.

* * * * *